United States Patent
Roberts

(10) Patent No.: US 8,023,689 B2
(45) Date of Patent: Sep. 20, 2011

(54) ROBUST SIGNATURE FOR SIGNAL AUTHENTICATION

(75) Inventor: David Keith Roberts, Crawley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 1394 days.

(21) Appl. No.: 10/518,265

(22) PCT Filed: Jun. 12, 2003

(86) PCT No.: PCT/IB03/02564
§ 371 (c)(1),
(2), (4) Date: Dec. 16, 2004

(87) PCT Pub. No.: WO04/002159
PCT Pub. Date: Dec. 31, 2003

(65) Prior Publication Data
US 2006/0059349 A1    Mar. 16, 2006

(30) Foreign Application Priority Data
Jun. 24, 2002 (EP) .................................... 02077502

(51) Int. Cl.
G06K 9/00 (2006.01)
G06K 9/36 (2006.01)
H04N 7/167 (2011.01)
(52) U.S. Cl. .......................... 382/100; 382/232; 380/201
(58) Field of Classification Search .................. 382/100, 382/250, 253; 713/176, 194; 380/268, 232
See application file for complete search history.

(56) References Cited

U.S. PATENT DOCUMENTS

| | | | |
|---|---|---|---|
| 6,185,312 B1 * | 2/2001 | Nakamura et al. | 382/100 |
| 6,285,775 B1 * | 9/2001 | Wu et al. | 382/100 |
| 6,341,350 B1 | 1/2002 | Miyahara et al. | |
| 6,477,276 B1 * | 11/2002 | Inoue et al. | 382/232 |
| 6,665,420 B1 * | 12/2003 | Xie et al. | 382/100 |
| 6,804,356 B1 * | 10/2004 | Krishnamachari | 380/201 |
| 6,879,703 B2 * | 4/2005 | Lin et al. | 382/100 |
| 6,971,010 B1 * | 11/2005 | Abdel-Mottaleb | 713/176 |
| 2003/0172275 A1 * | 9/2003 | Lee et al. | 713/176 |

(Continued)

FOREIGN PATENT DOCUMENTS

EP    0920185 A2    6/1999

(Continued)

OTHER PUBLICATIONS

Celik et al, "Hierarchical Watermarking for Secure Image Authentication With Localization", IEEE Transactions on Image Processing, vol. 11, No. 6, Jun. 2002.*

(Continued)

*Primary Examiner* — Gregory M Desire
*Assistant Examiner* — Andrae S Allison
(74) *Attorney, Agent, or Firm* — Larry Liberchuk

(57) ABSTRACT

A method, system and computer readable medium for the authenticating of an audio-visual signal, such as digital images or video comprising the generation of a robust image signature with variable size. In a preferred embodiment DC-values of blocks of a digital image are calculated and areas with similar DC-values are merged into regions. The signature is based on said regions and of variable length, depending on the desired localization ability or an allowable signature length. The resulting signature bits are robust to compression and other allowable image operations. The hierarchical solution provides both robustness and tampering localization.

14 Claims, 7 Drawing Sheets

U.S. PATENT DOCUMENTS

2006/0020830 A1 * 1/2006 Roberts .................. 713/194

FOREIGN PATENT DOCUMENTS

EP 0920185 A3 10/2001

OTHER PUBLICATIONS

Rey et al, "A Survey of Watermarking Algorithms for Image Authentication", EURASIP Journal on Applied Signal Processing 2002:6, 613-621.*

Chen et al, "Combined Digital Signature and Digital Watermark Scheme for Image Authentication", Info-tech and Info-net, 2001. Proceedings. ICII 2001—Beijing. 2001 International Conferences on vol. 5, Oct. 29-Nov. 1, 2001 pp. 78-82 vol. 5.*

Barr et al, "Using digital watermarks with image signatures to mitigate the threat of the copy attack", Acoustics, Speech, and Signal Processing, 2003. Proceedings. (ICAASP '03). 2003 IEEE International Conference on vol. 3, Apr. 6-10, 2003 pp. lll-69-72 vol. 3.*

* cited by examiner

ROBUST SIGNATURE FOR SIGNAL AUTHENTICATION

FIELD OF THE INVENTION

This invention relates in general to the field of signal authentication and more particularly to the authentication of digital images and video.

BACKGROUND OF THE INVENTION

The success of digital imaging and video has lead to a wide use of this technology in many fields of everyday life. Technology to edit, alter or modify digital images or video sequences is commercially available and allows modifications of the contents of said images or videos without leaving traces. For a variety of applications, such as evidential imaging in law enforcement, medical documentation, damage assessment for insurance purposes, etc., it is necessary to ensure that an image or video has not been modified and is congruent with the image or video originally taken. This led to the development of image or video authentication systems for which an example is shown in FIG. 1, wherein a signature or a watermark is created at 1.20 for a digital signal, i.e. an image or video, which is acquired in 1.10. The signature is embedded at 1.30 in the digital image or video. Thereafter the image or video is processed or tampered in 1.40, played, recorded or extracted in 1.50 and finally verified in 1.60 in order to either ensure that the authenticity of the digital image or video is proven or that modifications of the digital image or video are revealed.

In certain situations some changes to images are desired and allowable and should not be classified as malicious tampering when validating the authenticity of the images/video. Such changes occur e.g. when applying lossy compression to the digital image in order to reduce storage capacity or increase transmission rate. Lossy compression causes image modifications, but not to an extent that degrades the intended use of the images. An example for such a compression technique is the JPEG image file format, which reduces the size of a digital image considerably, i.e. the bit and byte sequence of the image is modified, while the perceptual information of the image is maintained.

Therefore a need exists for image authentication which distinguishes between allowable image modifications, such as lossy compression, and malicious tampering, such as the replacement of an image area with new content or with content copied from an earlier or later point in time of the same scenery.

One approach to authenticate images is to use classical cryptography, whereby a digital image is converted to a hash using a cryptographic key. The generated hash is taken as a "fingerprint" of the digital image. A digital image which authenticity is to be validated is converted to a hash using the same cryptographic key. If the new hash is exactly the same as the originally generated hash, the authenticity of the image is validated. By its nature classical cryptography is bit sensitive and a change of one bit in the original digital signal results in a completely different hash. Thus, when one bit of the image to be validated is changed during e.g. transmission or storage by e.g. compression, the image to be validated is classified as being tampered. Thus classical cryptography is not suited for authentication of a digital image having the above requirements concerning allowable modifications of the image.

An alternative is the embedding of semi-fragile watermarks or the creation of robust digital signatures. Both concepts maintain the perceptual information of the image and are based on generating additional information from the digital image and hiding the information in the image itself or its framework, or by transmitting or storing the additional information separately as "meta-data" with the image.

Semi-fragile embedded watermarks for authentication purposes provide tolerance against allowable operations such as compression at modest compression rates. However, when the digital signal has been tampered, watermark detection fails in areas of the original signal which have been tampered. The embedding of semi-fragile watermarks typically fails to provide the ability to distinguish between innocuous and malicious signal modifications. Furthermore it is fragile because the watermarks typically cannot survive high compression ratios. Also, in certain cases such as flat regions, a watermark cannot be embedded. Finally, it is not possible to identify tampering of the digital signal when flat contents is inserted in the image during tampering.

Robust signatures are a set of bits which summarizes the content of the image and which is relatively unchanged by compression or other allowable operations, but altered considerably by tampering. Many image properties can be used for computing a signature, e.g. edges, moments, DC-values, histograms, compression invariants, and projections onto smoothed noise patterns. All methods of generating signatures have in common that the size of the signature increases rapidly with the level of protection, i.e. the ability to accurately localize tampering. This poses a problem due to storing and transmitting requirements because when embedding the signature into the digital image, the size of a signature is critical, especially when embedding the signature as a robust watermark. A robust watermark is defined as a watermark which allows correct extraction of the payload bits even after operations that significantly degrade or damage the image, such as heavy compression or tampering by e.g. replacement of some pixels. A robust watermark allows in contrast to semi-fragile watermarks to extract the payload correctly, even after tampering. However, the payload of robust watermark schemes is very limited, typically just tens of bits. Thus, the problem to be solved by the invention is defined as how to provide a robust tamper detection for an audio-visual signal such as a digital image or a video, allowing localisation of tampering in the signal, but adding little payload to the signal.

SUMMARY OF THE INVENTION

The present invention overcomes the above-identified deficiencies in the art and solves the above problem by providing a method and system of authenticating an audio-visual signal comprising the formation of a progressive and robust signature which has a small and adaptable signature size, according to the appended independent claims.

According to embodiments of the invention, a method, an apparatus, and a computer-readable medium for authenticating an audio-visual signal is disclosed. A progressive signature is formed for the audio-visual signal whereby the audio-visual signal is split into blocks. The DC-values of the blocks are then calculated. The blocks are assigned to regions with similar DC-values and DC-differences between the regions are calculated thereafter. Finally signature bits are generated based on the DC-differences calculated.

These and other aspects of the invention will be apparent from and elucidated with reference to the embodiments described hereafter.

BRIEF DESCRIPTION OF THE DRAWINGS

Preferred embodiments of the present invention will be described in the following detailed disclosure, reference being made to the accompanying drawings, in which.

DESCRIPTION OF PREFERRED EMBODIMENTS

Signature Generation

Figure 1:
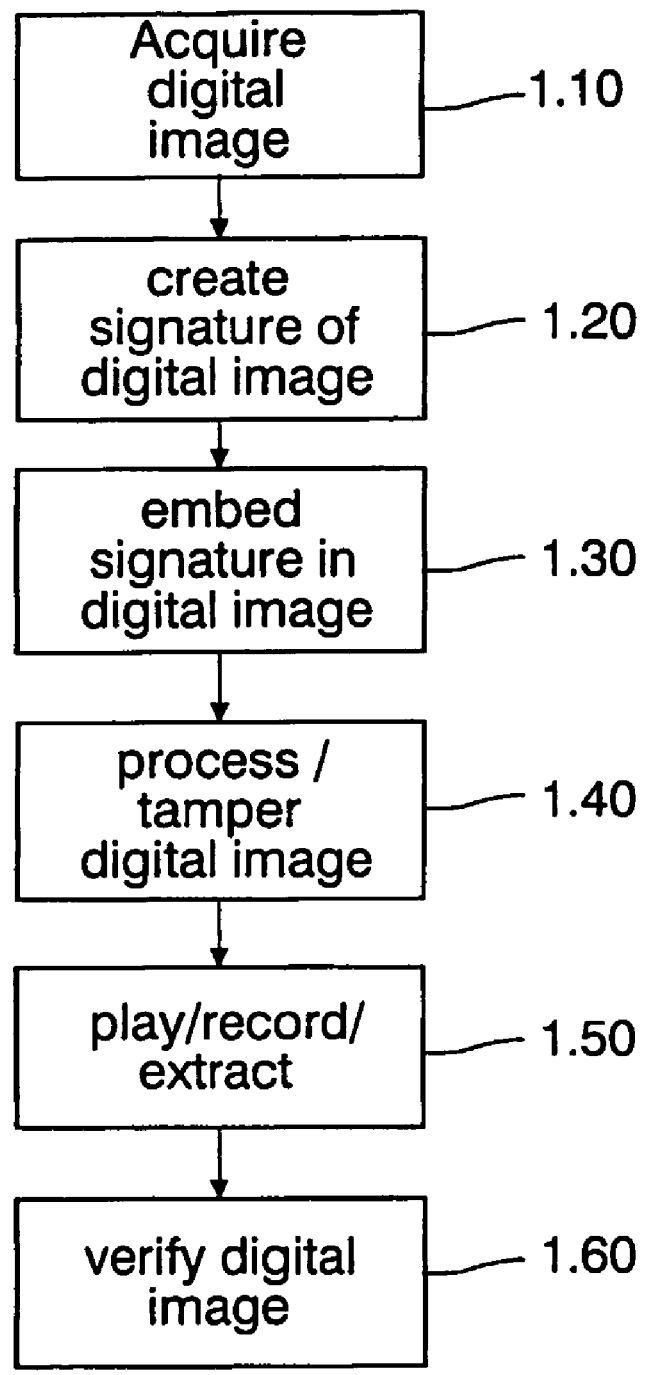
FIG. 1 shows a Prior Art Image Authentication System.
Figure 2:
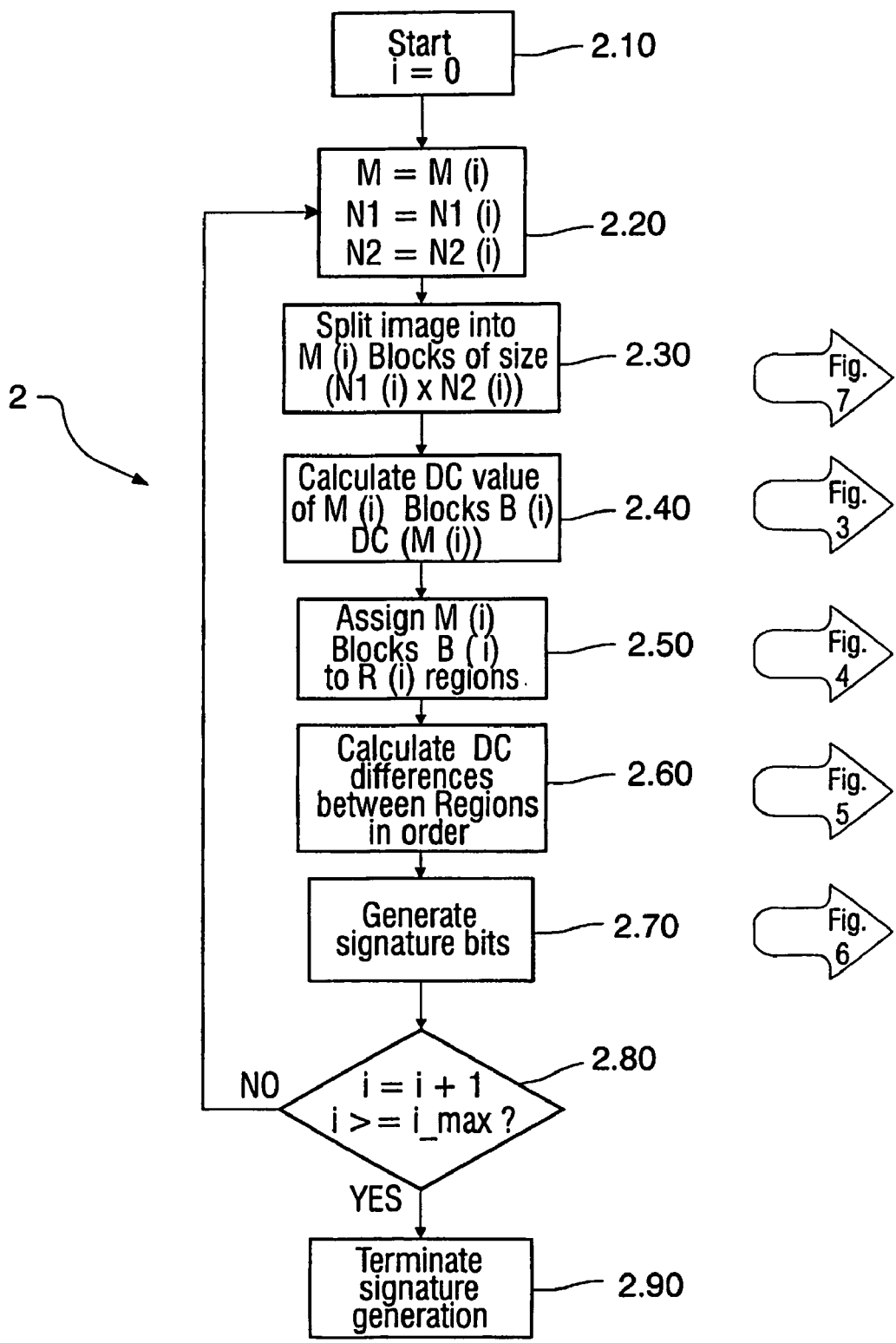
FIG. 2 is a flowchart illustrating the method according to an embodiment of the method according to the invention.

FIG. 2 shows a flowchart of a preferred embodiment according to the invention. A process 2 of generating a signature for a digital image is initiated in step 2.10. A counter variable i is set to zero. In step 2.20, a loop sequence starts and the variable M, defining the number of blocks to be generated in step 2.30, is set to a value M(i) which is allocated to the current loop and the variables N1 and N2, defining the size of the M blocks to be generated in step 2.30, are set to values N1(i) and N2(i) which are allocated to the current loop. The value of M is at least 1 and maximally equivalent to the maximal number of pixels in any direction of the digital image. The values of N1 and N2 defining the block size are based on the number of blocks and the size of the digital image, thus at least 1 and maximally equivalent to the maximal number of pixels in any direction of the digital image. In the first loop, the values for M, N1 and N2 are chosen such that relatively large blocks are generated, e.g. blocks of the size 128×128 pixels.

In step 2.30 the image is subdivided into M(i) blocks of size N1(i)×N2(i). Thereafter, the DC-values of each block is calculated in step 2.40. The DC-value is defined as the mean luminance.

The M(i) blocks are assigned to regions with similar DC-values in step 2.50, which is described in more detail in connection with reference to FIG. 4.

The differences between mean DC-values of the above assigned regions is calculated in step 2.60 and is described in more detail in connection with reference to FIG. 5.

Signature bits are generated in step 2.70, preferably by thresholding the above differences. This step is described more detailed below in connection with reference to FIG. 6.

In step 2.80 the decision is taken if the loop will be continued by going back to step 2.20 or if the signature generation is terminated in step 2.90 when the desired number of signature bits has been generated.

Figure 7:
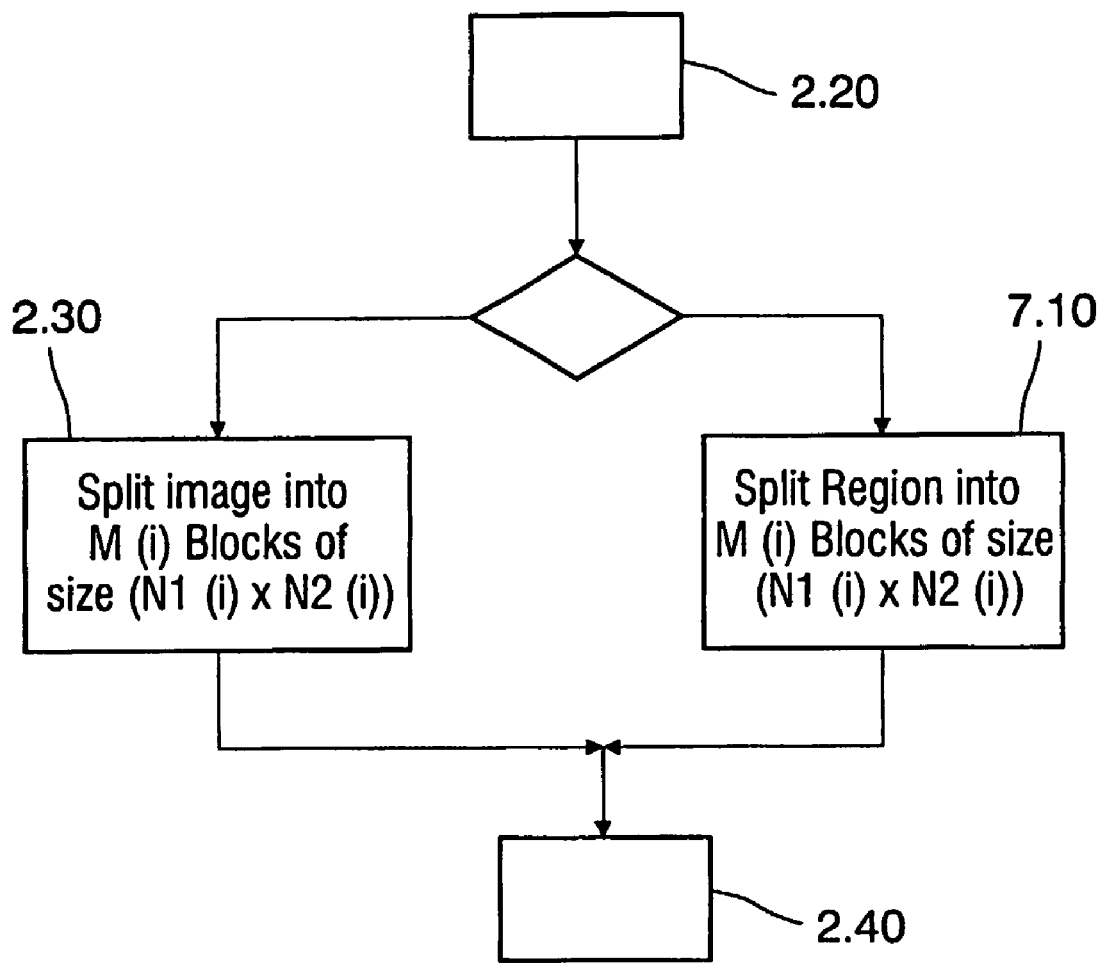
FIG. 7 is a flowchart illustrating an alternative block generation in the second run.

FIG. 7 shows an alternative to step 2.30 in FIG. 2. Instead of splitting up the entire image from scratch, the regions formed at the previous level can be split up. This can be done starting from the second run of the loop 2.20 to 2.80 when regions already have been generated in the previous run.

Figure 3:
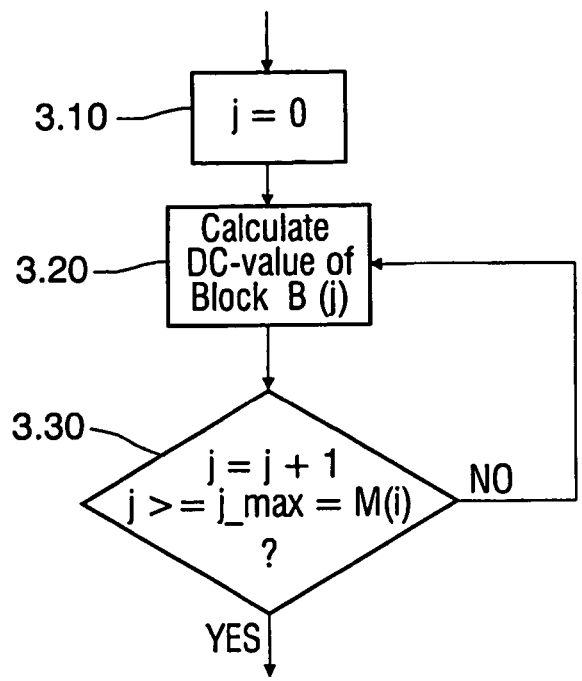
FIG. 3 is a flowchart illustrating how a digital image is split into blocks.

An exemplary loop illustrating the DC value calculation for all blocks is shown in FIG. 3. A loop variable j is initialized in 3.10 and the DC-value of block B(j) is calculated in 3.20. In step 3.30 the loop variable is increased an if the DC-values for all blocks have not been calculated, step 3.20 is repeated for the next block, otherwise the calculation of block DC-values is terminated.

Figure 4:
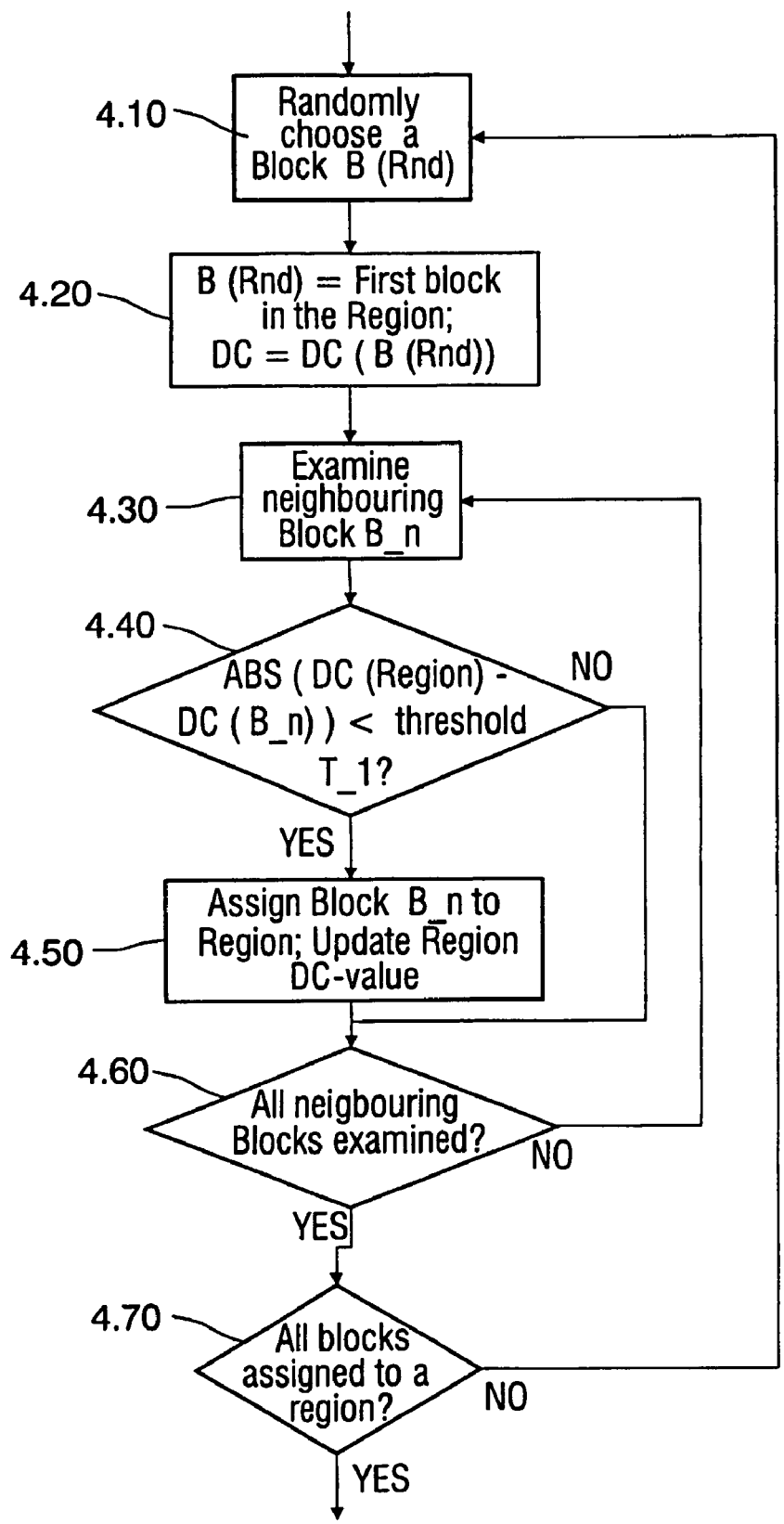
FIG. 4 is a flowchart illustrating the assignment of blocks into regions.

FIG. 4 illustrates how the blocks are assigned to regions. Firstly, a block is picked according to a pseudo random sequence in 4.10. This Block B(Rnd) becomes the first block in a region in step 4.20. The initial DC value of the region is thus the same as the DC-value of the first block. Next, the neighbouring blocks to the first block are examined in 4.30 to 4.60. In step 4.40 it is examined if the absolute difference between the DC value of the block currently examined and the current region is less than a threshold T_1, and in case the DC-value is lower, then the block is assigned to the current region in step 4.50 and the DC-value of the region is updated. If not all neighbouring blocks have been examined, the loop goes back to step 4.30 in step 4.60 and continues with the next neighbouring block. In 4.70 it is checked whether each of the available blocks is assigned to a region and the loop goes back to step 4.10 if a block has not yet been assigned to a region.

Figure 5:
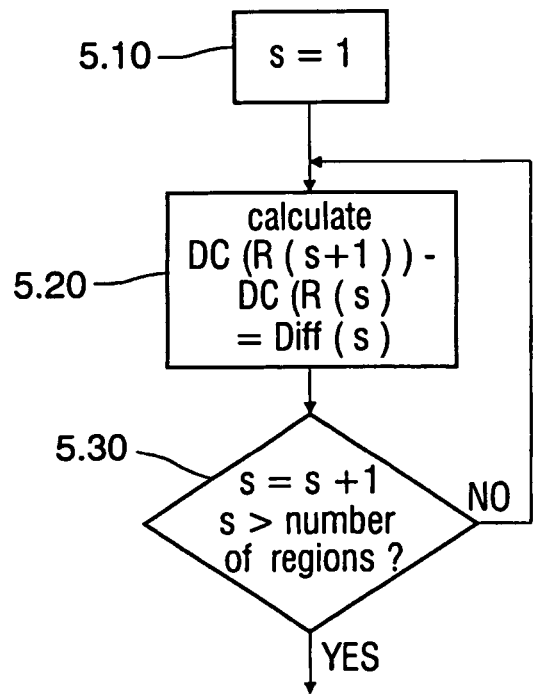
FIG. 5 is a flowchart illustrating the regional difference calculation.

The resulting regions' DC-values are arranged according to FIG. 5 in the order in which the regions were formed according to FIG. 4 and the difference of the DC-values of the regions is calculated, i.e. [DCr2−DCr1, DCr3−DCr2, DCr4−DCr3, . . . ] in step 5.20. Step 5.10 initiates a counter variable s and step 5.30 checks if all differences have been calculated. If this is not the case, the loop branches back to step 5.20 and calculates the next DC-difference-value until the last value is calculated.

Figure 6:
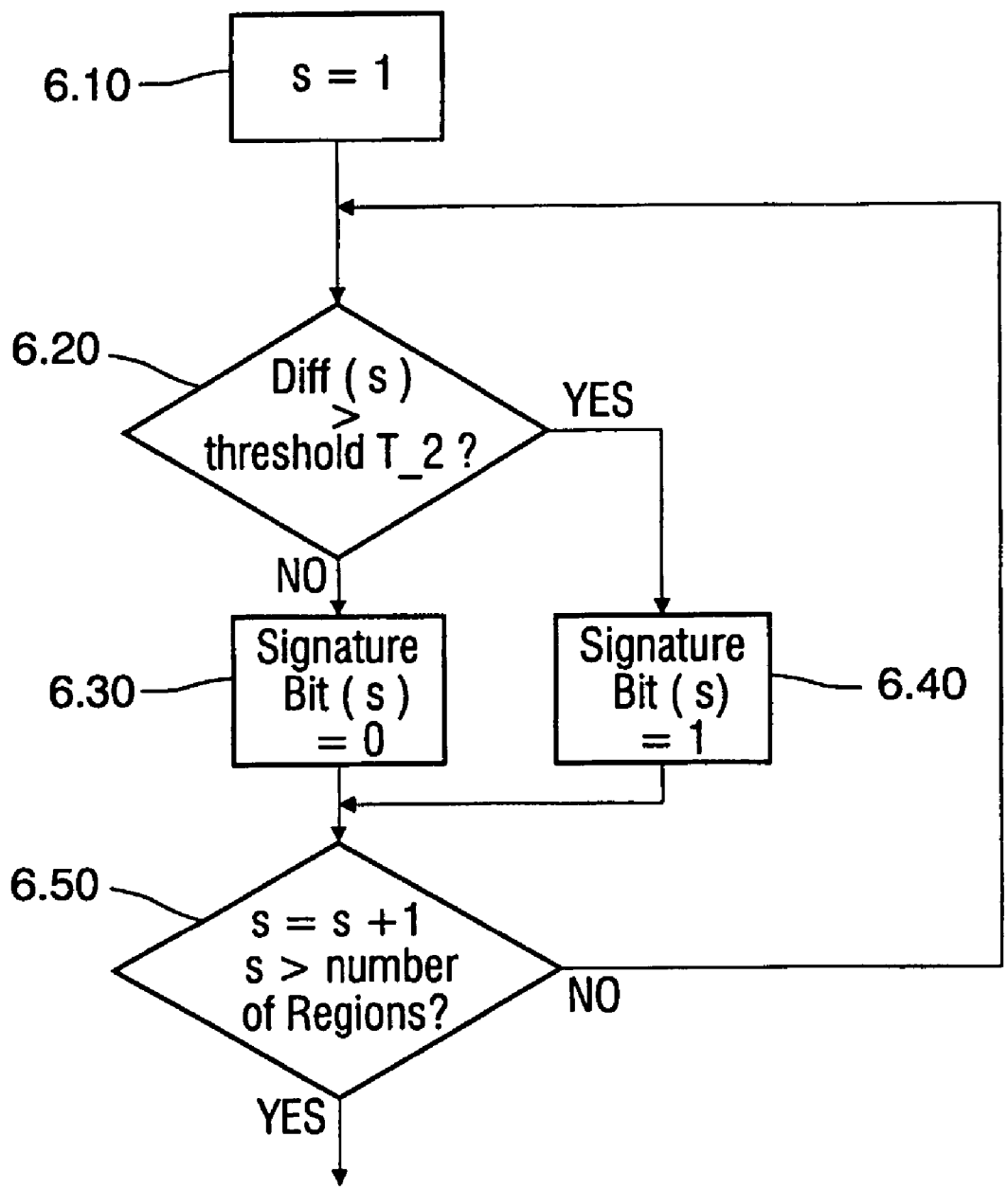
FIG. 6 is a flowchart illustrating the signature bit generation.

Signature bits are generated according to FIG. 6, whereby a counter variable s is initialized in step 6.10 and it is checked in step 6.50 if all differences calculated above (FIG. 5) have been converted to signature bits. In step 6.20 it is checked if the current examined difference is larger than a threshold T_2. If this is positive, the current signature bit is assigned a '0' in 6.30, otherwise the current signature bit is set to '1' in 6.40.

The above-described preferred embodiment according to the invention provides a hierarchical approach. Firstly, a few signature bits are calculated at a coarse level using large block sizes. Then further signature bits are calculated at finer levels using progressively smaller block sizes. The earliest bits in the signature are the most robust, but can provide only poor localisation of any image alterations due to the large block size used. Thus the signature incorporates information concerning the whole image first at a coarse level, and then at progressively more detailed levels, continuing as far as the permitted signature size allows.

The localisation ability of the above-preferred embodiment according to the invention is automatically adapted to the image content. In content with sparse details and many flat regions, many blocks will be merged. This results in a few regions of large size and therefore only a few signature bits. This allows to progress to smaller block sizes and thus better localisation is achieved with the same signature length.

It is understood, that the signature bits are determined by the most important details of the digital image, because the regions that are formed are used to generate the signature bits. Boundaries between the regions are in areas where edges and details occur in the digital image.

In order to optimize performance, the block sizes at each level and also the values of the threshold used at each level to decide whether or not to add a block to a region, are adjustable.

By using differences between DC-values of different image blocks, the above described signature generation is robust as DC differences are robust image property that is little affected by compression and other acceptable non-malicious image alterations. Therefore DC-values are preferred in the above-described embodiment according to the invention. Though, other image properties can also be used for computing a variable signature according to the invention, such as edges, moments, histograms, compression in variants, and projections onto smoothed noise patterns.

In order to successfully forge an apparently authentic image, any altered content would have to be replaced by content giving a similar DC value in each block considered during the signature formation. Successful forgery is very difficult because the block boundaries are unknown to the forger.

Security is also provided via the pseudo random sequence that determines the choice of blocks with which to begin the formation of regions. Using a pseudo random sequence to determine the order in which the comparisons with neighbouring blocks' DC values are made is used to build additional security.

Varying the position of the grid defining the block boundaries provides further security against forgery. In this case, a means is provided in the authentication device to determine the grid boundary prior to checking the signature. One such means is to indicate the grid location via a separate watermark detectable by the authentication device. This has the additional advantage of providing increased robustness in the presence of jitter and cropping.

In some applications, such as security imaging, only one of a plurality of frames, e.g. one frame in every 50 frames, is stored. It is therefore important that each frame is capable of authenticating itself without reference to preceding or subsequent frames. The above method meets this requirement as it treats each video frame as a separate still image. This also means that the method is equally applicable to both still images and video.

In the above method signature formation continues until the required number of bits has been generated. The allowable signature length is determined by the number of bits of metadata that may be stored/transmitted, or by the payload capacity of the watermark that will be used to embed the signature into the image. The longer the signature is, the more precise is the localisation of tampered image regions.

Figure 8:
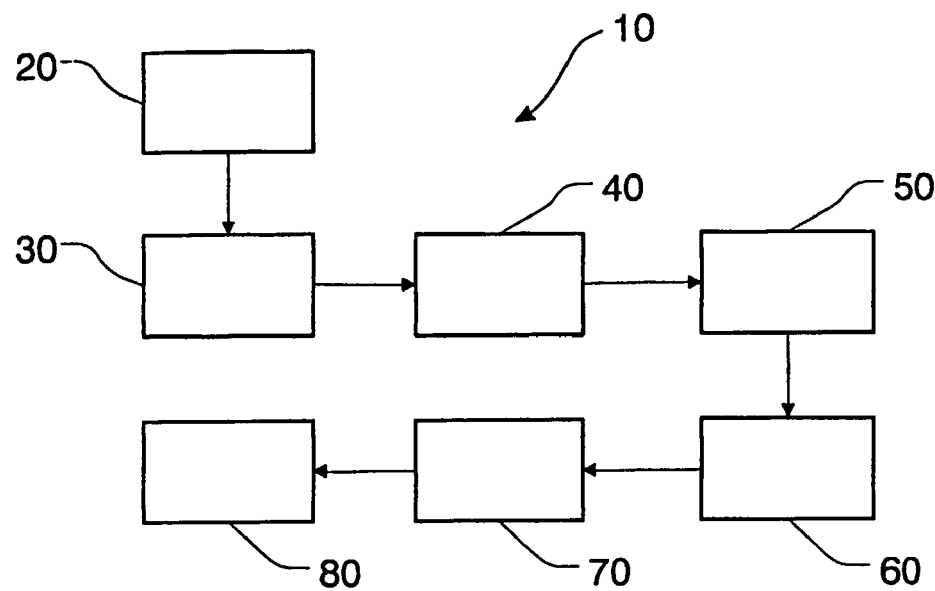
FIG. 8 illustrates an apparatus according to another embodiment of the invention.

FIG. 8 illustrates an embodiment of the invention in an apparatus. A system 10 for authenticating an audio-visual signal is shown. An audio-visual signal is generated in 20. Preferably the audio-visual signal is captured in 20 by an image capturing device camera, such as a surveillance camera or a CCD array and/or an appropriate means for capturing the audio signal, such as a microphone. However, the audio-visual signal may also originate from a transmission signal, such as a video signal, or from a storage device, such as a hard disk drive or similar computer readable medium. A means 30 splits the audio-visual signal into blocks. The DC-value for each block is calculated by a means 40. Blocks with similar DC values are assigned by means 50 to regions. Thereafter DC-differences between the regions, i.e. differences of the DC-values of the above regions, are calculated by means 60 and then signature bits are generated by means 70 based on the DC-differences calculated by means 60. In 80 the signature generated is further processed, i.e. preferably embedded in the audio visual signal, preferably as a robust watermark. Means 30, 40, 50, 60 and 70 are preferably implemented in the system 10 as a module, preferably comprising a microprocessor or similar electronic device such as a programmable array or similar electronic circuit.

Figure 9:
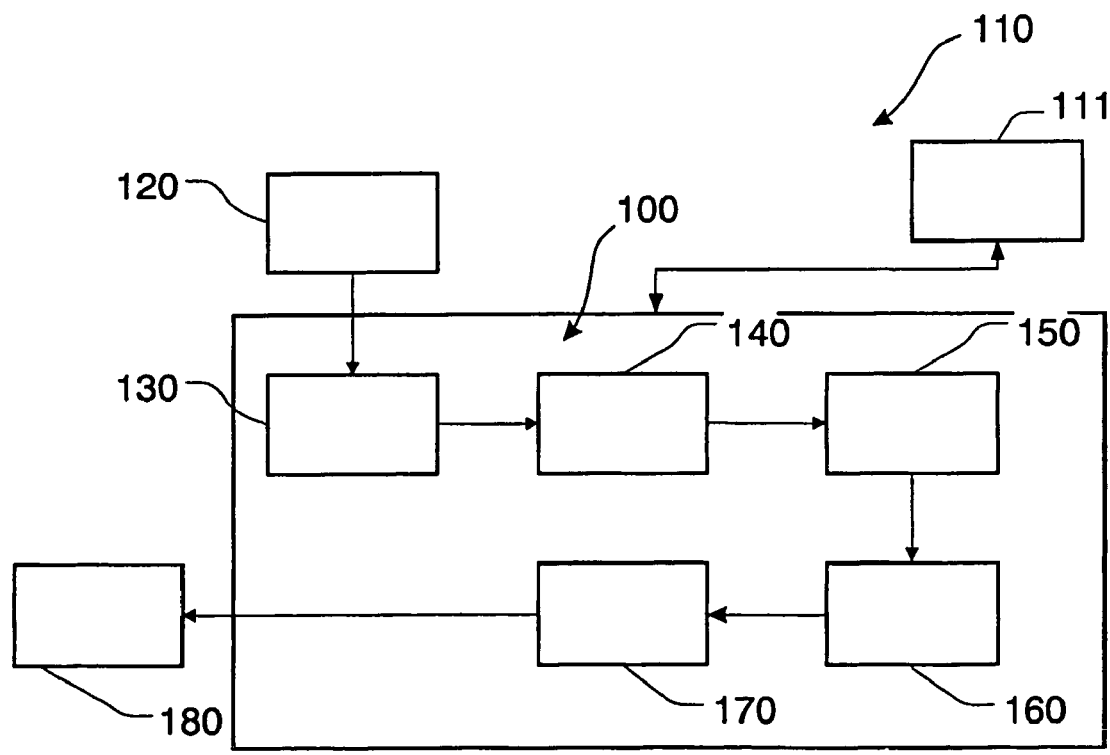
FIG. 9 illustrates a computer readable according to still another embodiment of the invention.

FIG. 9 illustrates another embodiment of the invention comprising a computer readable medium 100 for authenticating an audio-visual signal. An audio-visual signal is generated in 120. Preferably the audio-visual signal is captured in 120 by an image capturing device camera, such as a surveillance camera or a CCD array and/or an appropriate means for capturing the audio signal, such as a microphone. However, the audio-visual signal may also originate from a transmission signal, such as a video signal, or from a storage device, such as a hard disk drive or similar computer readable medium. A first program module 130 directs a computer 110 to split the audio-visual signal into blocks. The computer 110 comprises a processor 111 executing the computing instructions from the program modules described herein. The DC-value for each block is calculated by a second program module 140 directing the computer 110. Blocks with similar DC values are assigned to regions by a third program module 150 directing the computer 110. Thereafter DC-differences between the regions, i.e. differences of the DC-values of the above regions, are calculated by a fourth program module 160 directing computer 110 and then signature bits are generated by a fifth program module 170 directing computer 110 based on the DC-differences calculated by program module 160. In 180 the signature generated is further processed, i.e. preferably embedded in the audio visual signal, preferably as a robust watermark.

The method, apparatus and program instructions described above include inherent flexibility in that more signature bits, giving increased localisation ability, can easily be generated when the development of storage or transmission or watermark techniques advances, e.g. due to higher available transmission rates or larger memory chips at lower price, and allows a larger signature.

By using differences between DC-values of a digital image, the resulting signature bits are robust to compression and other allowable image operations.

The merging of areas with similar DC-values results in a signature with reduced size and further increases the robustness of the signature because small DC differences give unreliable signature bits.

The hierarchical approach provides both robustness and tampering localisation.

The signature is automatically adapted to the image content because for images which contain fewer details, the signature provides automatically increased localisation.

Thanks to the fact that the calculation of the signature does not demand high computational power, the signature can be embedded into video.

Flexibility is provided because the signature can be truncated at whatever length suits the current application. Improvements in other parts of the system which allow a larger signature to be generated, result directly in improved tamper localisation.

Hence, the method according to the invention has the advantages of robustness, tamper localisation, short signature length, and flexibility.

In order to judge the authenticity of an image, a similar procedure to the signature formation is used. However, at each comparison of DC values, a "soft-decision" is taken i.e. the value of the DC differences is used to judge the probability of whether a block was merged into a region or not. In this manner a trellis is constructed that charts the probability of different signatures being formed from the received image. In one embodiment, a Viterbi type algorithm is used to determine the most probable manner of forming a signature matching that generated from the original image. The signature given by the watermark provides the most likely region formation, but that special care is taken to control error probabilities.

An authentic image shows only minor changes in its DC values due to compression or other allowable processing. There is therefore a high probability of the received image being able to generate a matching signature. If, however, the image has been maliciously altered, at least one of the calculated DC differences is significantly altered, and the overall probability of the suspect image generating a matching signature is low, indicating that larger image modifications have occurred, as well as that at one or more points during the generation of a matching signature, some of the decisions that have to be made will have a very low associated probability. For example, for the image to be authentic, compression has to have caused a large DC difference to have become very small, which is very unlikely. This fact can be used to localize which regions of the image have been tampered.

Image authentication is an asymmetric problem in the sense that very many images need to be equipped with authentication capability, but only relatively few of these will actually have their authenticity checked. In the security camera scenario, for example, all frames generated by the camera have their signature calculated, but perhaps only one frame in every fifty will actually be recorded. Moreover, only a very small number of the recorded frames is needed to be authenticated, e.g. authentication which is required in the event that these frames are used as evidence in a court case. The result is that the signature calculation performed for every frame must have lower computational requirements than the rarely performed authenticity verification.

In a preferred embodiment of the invention, the signature calculation is therefore positioned close to the image capture device in order to prevent the possibility of tampering before the signature is calculated. In this case the signature calculation and, if appropriate, embedding of it as a watermark, has to take place in real-time on the video stream inside a camera. This places severe constraints upon the complexity of the signature calculation and watermark embedding algorithms.

The signature generation method described above is based upon calculating DC values, which is not a computationally demanding or memory hungry task. Signature generation and embedding according to the above method can therefore be done in real-time.

In case tampering is detected, an analysis of the modification is undertaken. Applications and use of the above described signal authentication according to the invention are various and include exemplary fields such as security cameras or surveillance cameras, such as for law enforcement, evidential imaging or fingerprints, health care systems such as telemedicine systems, medical scanners, and patient documentation, insurance documentation applications such as car insurance, property insurance and health insurance.

The present invention has been described above with reference to specific embodiments. However, other embodiments than the preferred above are equally possible within the scope of the appended claims.

Furthermore, the term "comprising" does not exclude other elements or steps, the terms "a" and "an" do not exclude a plurality and a single processor or other unit may fulfil the functions of several of the units or circuits recited in the claims.

The invention claimed is:

1. A method of authenticating an audio-visual signal comprising:
   formation of a progressive signature by generating a variable number of signature bits,
   splitting said audio-visual signal into blocks,
   calculating an DC-value for each of said blocks,
   assigning blocks with similar DC-values to regions,
   calculating differences between DC-values of said regions, and
   generating said number of signature bits based on said differences between said DC-values of said regions;
      wherein the assigning said blocks to regions with similar DC values further comprises repeating:
         picking a first block not yet assigned to a region according to a pseudo-random sequence wherein said first block becomes the first block of a new region and the DC-value of said first block becomes the DC-value of said new region, and
         examining each neighbouring block of said first block whereby a further block of said neighbouring blocks is assigned to said new region and the DC-value of the new region is updated with the DC-value of the further block if the DC-value of said further block is less than a threshold,
      until all blocks are assigned to a region.

2. A method according to claim 1 further comprising progressively decreasing the size of said blocks.

3. A method according to claim 2 further comprising generating said signature from the contents of said blocks, whereby said number of signature bits progressively increases with decreasing block size.

4. A method according to claim 1 wherein the formation of said progressive signature is at least once looped.

5. A method according to claim 4 wherein the size of said blocks is decreased in each loop.

6. A method according to claim 1 wherein the length of said signature with a variable number of signature bits is limited to a maximum signature length.

7. A method according to claim 6 further comprising embedding said signature in said audio-visual signal as a watermark, said maximum signature length being defined as the maximum payload of the watermark.

8. A method according to claim 1 further comprising implanting said signature in said audio-visual signal and/or storing or transmitting said audio-visual signal, wherein said signature is a watermark.

9. A method according to claim 1 further comprising verifying the authenticity of said audio-visual signal by verifying said signature.

10. A method according to claim 1 whereby the calculating DC-differences between said regions further comprises
    arranging the DC-values of said regions in the order in which the regions are formed and
    calculating said DC-differences between consecutive regions for all regions.

11. A method according to claim 1 whereby the splitting said audio-visual signal into blocks includes said blocks being formed in a previously formed region.

12. A method according to claim 1 whereby said generating signature bits based on said DC-differences includes thresholding said DC-differences.

13. A method according to claim 1, wherein said audio-visual signal is a digital image or frame of a digital video.

14. A system for authenticating an audio-visual signal comprising a device for formation of a progressive signature generating a variable number of signature bits,
    wherein said device for formation of a progressive signature comprising:
    a means for splitting said audio-visual signal into blocks,
    a means for calculating the DC value of said blocks,
    a means for assigning said blocks to regions with similar DC values, a means for calculating DC-differences between said regions, and a means for generating said signature bits whereby the signature bits are based on said DC differences, wherein said means for assigning said blocks to regions with similar DC values is configured to repeatedly:

pick a first block not yet assigned to a region according to a pseudo-random sequence wherein said first block becomes the first block of a new region and the DC-value of said first block becomes the DC-value of said new region, and examinine each neighbouring block of said first block whereby a further block of said neighbouring blocks is assigned to said new region and the DC-value of the new region is updated with the DC-value of the further block if the DC-value of said further block is less than a threshold, until all blocks are assigned to a region.

\* \* \* \* \*